United States Patent Office 3,451,278
Patented June 24, 1969

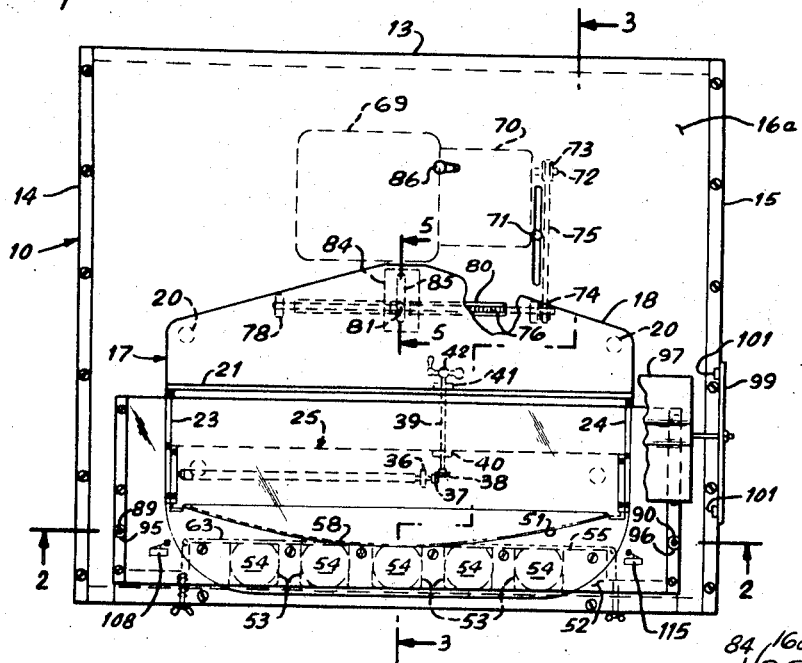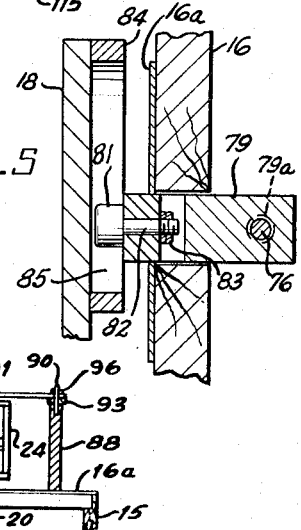

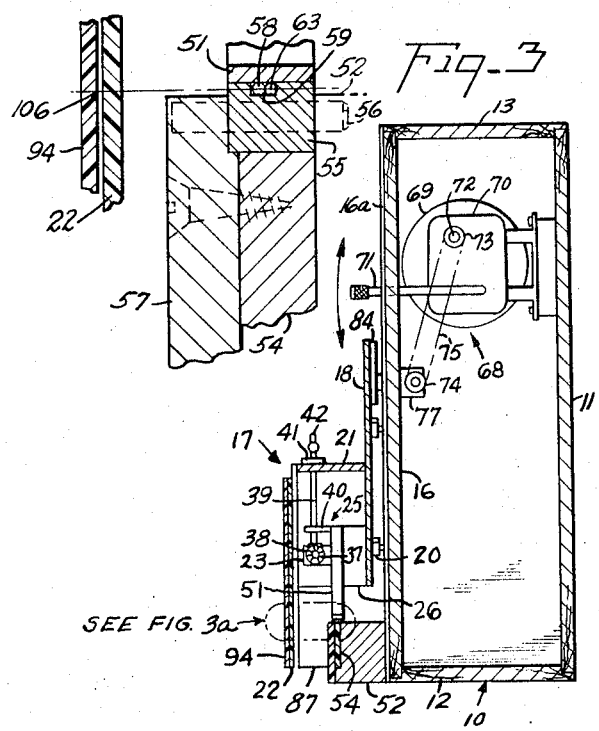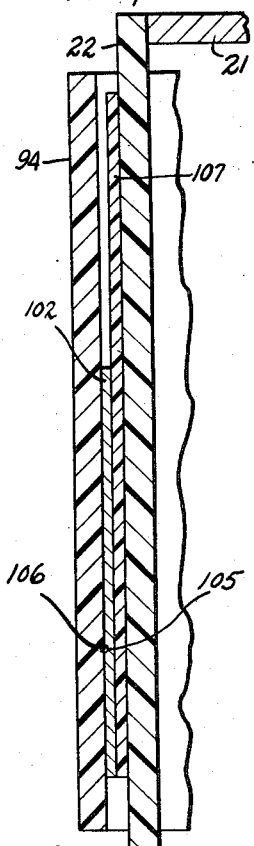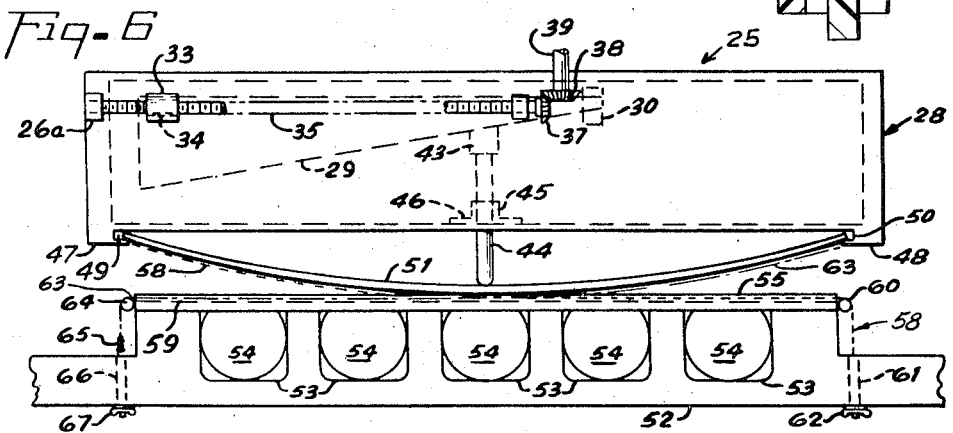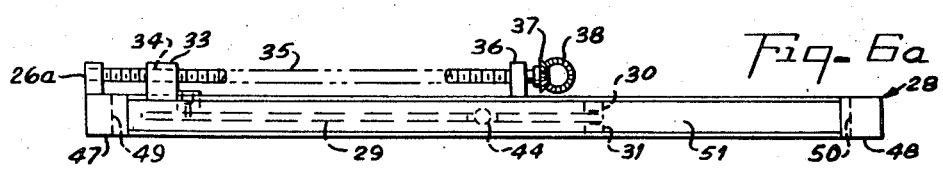

3,451,278
APPARATUS FOR SIMULATING THE PURE ROLL-ING BETWEEN PITCH CIRCLES OF TWO MATING MEMBERS
Bruce S. Bonino, Marlton, N.J., assignor to Uniroyal, Inc., a corporation of New Jersey
Original application July 26, 1963, Ser. No. 297,836, now Patent No. 3,315,265, dated Apr. 18, 1967. Divided and this application Mar. 15, 1967, Ser. No. 655,683
Int. Cl. F16h 25/16
U.S. Cl. 74—57                                       11 Claims

ABSTRACT OF THE DISCLOSURE

An apparatus for simulating the pure rolling between pitch circles of two mating members comprising a carriage having mounted on it an adjustable arc having a center corresponding to the center of one of the members. The carriage is movable along a bar having a rolling surface determined from the center of the other mating member. One end of the arc and one end of the bar remote from said one end of the arc are connected by an inextensible flexible member.

---

This is a division of application Ser. No. 297,836, filed July 26, 1963, now Patent No. 3,315,265.

This invention relates to an instrument for recording the profile generated by a given profile during the relative pure rolling between the pitch circles of a pair of mating members. The invention also relates to the method and instrument for generating and recording a profile under the above conditions.

As used herein the term "pure rolling" shall mean a rolling action between two pitch circles without slipping. The term "pitch circle" shall have its usual meaning in standard gear terminology as applied to gears and cams but shall also include the term "pitch line" as used for a rack or toothed belt.

In the design and manufacture of gears, cams, gear cutters and grooved pulleys it is often necessary to determine the profile of one mating member when the tooth or groove profile for the other mating member has been previously established. For example, when a desired drive member, such as a toothed belt, has been designed and manufactured, it is necessary to determine what pulley groove will yield an interference free drive between the belt tooth and pulley groove and at the same time provide pure rolling between the pitch circles of the respective members. It has been found that the groove that will provide the above results is the conjugate form or profile of the tooth that is generated during the pure rolling of the pitch circles. Prior to my invention a manual technique was used to lay out the desired profile. This technique involved the use of drawing instruments, pencil templates and numerous guide lines for locating the template, thus introducing human error into the technique and making it virtually impossible to produce an entirely accurate profile. The manual technique also required considerable time.

Accordingly, it is an object of this invention to provide an instrument and method for profile generation.

Another object is to provide an instrument for simulating the pure rolling between pitch circles of two mating members.

Another object is to provide a means for automatically recording a generated profile.

A still further object is to provide an instrument and a method for generating and recording profiles that greatly improves the accuracy and greatly reduces the time previously required by the manual technique.

These and other objects are accomplished by providing a means for simulating the pitch circles of a pair of mating members including first and second elements adapted for rolling movement relative to one another, means for rolling at least one of the elements, a form on one of the elements having a profile corresponding to the profile of one of the mating members, the form profile having a pitch circle aligned with the simulated pitch circle of the one element, and means on the other of the elements for recording the conjugate profile of the form profile during the relative rolling of the elements.

Various changes and modifications in detail for the instrument may be made within the scope of the invention.

Referring to the drawings:

FIG. 1 is a plan view of the instrument with parts broken away;

FIG. 2 is a cross section taken along line 2—2 in FIG. 1 showing parts in section and parts broken away;

FIG. 3 is a cross section taken along line 3—3 in FIG. 1;

FIG. 3a is an enlarged view of a portion of FIG. 3;

FIG. 4 is a fragmentary view of a portion of FIG. 3;

FIG. 5 is a fragmentary cross section taken along line 5—5 in FIG. 1;

FIG. 6 is a plan view of the instrument with the platform and bridge portions removed;

FIG. 6a is a front view of the arc device shown in FIG. 6;

Figure 7:
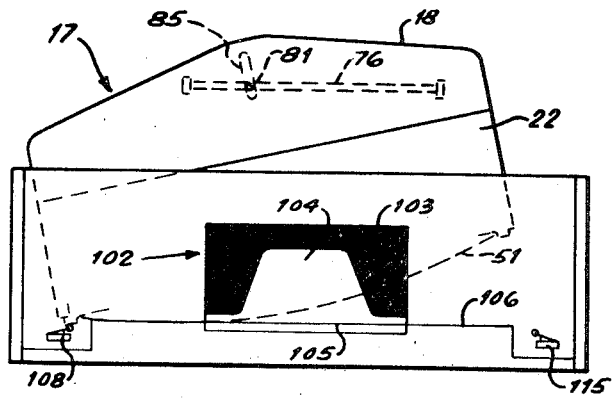
FIG. 7 is a schematic of the invention showing the carriage at one extreme position of travel.

The instrument will now be described in detail. Referring to FIGS. 1 and 3, a frame shown generally at 10 comprises a bottom support member 11, a front vertical support 12, a rear vertical support 13, side vertical supports 14 and 15, and a top member 16. To provide a smooth, even surface, a plate 16a made preferably of steel covers the upper surface of top member 16. Frame 10, therefore, forms a box-shaped table to support the various working elements of the instrument.

A carriage shown generally at 17 is provided with a support pallet 18. Four ball rollers 20 (see FIGS. 1 and 2) are fixed to the underside of pallet 18 and support pallet 18 for rolling movement in any direction atop plate 16a. A vertical transverse support member 21 is secured to the upper surface of pallet 18 and supports the rearwardly extending edge of platform 22. Platform 22 is supported at its side edges by laterally spaced vertical support members 23 and 24 which are secured to the upper surface of pallet 18.

A commercial device known as an "Arcmeter" which is manufactured by the Arcmeter Company of Rockford, Ill., is utilized with my invention in a modified form. The arc device is constructed in a manner which enables an operator to select an arc having any desired radius within a given range. The arc device is shown generally at 25 and is positioned and supported adjacent the forward edge of pallet 18 by laterally spaced vertical blocks 26 and 27 (see FIG. 2). Arc device 25 comprises a housing 28 (see FIG. 6) which contains contains a generally triangularly shaped slidable cam 29. Cam 29 is supported at one end by spaced blocks 30 and 31 and is secured at its other end to a bracket 32. (See FIGS. 2, 6 and 6a.) Bracket 32 has an upwardly extending flange 33 that has a threaded aperture 34 extending therethrough. A threaded lead screw 35 is provided to accomplish the sliding movement of cam 29. Lead screw 35 is journaled at one end in a support block 26a, threaded through aperture 34 and journaled adjacent its other end in support block 36. A bevel gear 37 is secured to the other end of lead screw 35 and positioned to mesh with a second bevel gear 38 which is secured to the end of an adjusting shaft 39. Shaft 39 is rotatably supported by block 40 secured to housing 28 and block 41 secured to vertical support member 21. A cam adjusting crank 42 (see FIGS. 1 and 3) is fixed to shaft 39 and provides a means for rotating shaft 39 which in turn effects the rotation of lead screw 35 through bevel gears 37 and 38. The rotation of lead screw 35 causes threaded bracket 32 and cam 29 which is affixed to the bracket to move axially of lead screw 35.

A cam follower 43 is in sliding contact with cam 29 and is secured to one end of arc adjusting pin 44. Pin 44 is supported for sliding movement in a bushing 45 which is secured to housing 28 by a bracket 46.

Housing 28 has outwardly extending portions 47 and 48 (see FIG. 6) which are slotted at 49 and 50, respectively, to receive the ends of a freely supported metal band 51. The metal band 51 is tapered from its center outwardly toward the ends to provide a perfect arc at the outer surface of the band regardless of what position pin 44 may take. To adjust the radius of the arc the operator turns crank 42 which moves cam 29 axially of lead screw 35 as discussed above. The movement of cam 29 forces cam follower 43 in a direction perpendicular to the axis of the lead screw. The movement of cam follower 43 in turn moves pin 44 axially within bushing 45 and causes the center of metal band 51 to assume a different position relative to housing 28. This structure provides a means for obtaining an arc having any desired radius. The arc device may be provided with any suitable means for indicating the radius of arc 51 for each location of pin 44.

Referring to FIGS. 1, 3 and 6, a large support block 52 having recessed portions 53 is secured to the upper surface of plate 16a. Recesses 53 are provided in block 52 to receive magnets 54 the function of which will be described more fully hereinbelow. A transversely extending bar 55 (see FIG. 6) which will be referred to herein as the "pitch bar" is supported along the inner surface of block 52 and is secured to said block by a series of pins 56 which extend through a retaining plate 57. Referring to FIG. 3a which is an enlarged fragmentary view of a portion of FIG. 3 showing the pitch bar, bar 55 is located in block 52 at a vertical position so that arc 51 will contact bar 55 when carriage 17 is rolled in the direction of block 52. Magnets 54 are located directly in contact with the side of bar 55 opposite to that which is in contact with arc 51. Arc 51 is constructed of a ferrous material or a ferrous alloy and will, therefore, be held in contact with bar 55 by the magnetic attraction of magnets 54. It is preferable to construct bar 55 of any suitable material other than a ferrous material to prevent confinement of the magnetic field within the bar 55. Thus, carriage 17, which is free to move in any direction, will be held against bar 55 by the magnetic attraction between magnets 54 and arc 51.

Although a magnetic means has been shown as the preferred means for maintaining contact between arc 51 and bar 55, it will be apparent to those skilled in the art that other means may be provided to accomplish this function. For example, the arc and bar may be provided with opposed charges which attract and thereby be electrostatically maintained in contact. Also, surface 16a can be tilted toward bar 55 to provide a gravitational force on carriage 17 or any suitable mechanical means, such as springs, would accomplish the desired result.

Referring again to FIG. 6, a wire 58 is attached to member 47 adjacent the contact surface between arc 51 and slot 49 and is wrapped around arc 51 to the point of contact between arc 51 and pitch bar 55 (see FIG. 3a).

Bar 55 has a recessed portion 59 along its entire length which allows wire 58 to be recessed into bar 55 so that bar 55 and arc 51 may remain in contact. After leaving arc 51 at the point of contact between bar 55 and arc 51, wire 58 follows recessed portion 59 to the end of bar 55 where it is trained around a pulley 60 (see FIG. 6) and secured to one end of adjusting screw 61. Screw 61 passes through block 52 and may be adjusted within the block by wing-nut 62.

Wire 58 is constructed of any suitable material that will provide a substantially inextensible flexible member, having its neutral axis located at fixed constant distances from the surfaces (i.e., opposite surfaces) by which it is supported when it is wrapped around two members which are in contact. The preferred material is a steel wire or band of uniform cross section, however, other metals and synthetic materials may be used. The wire may also have a cable construction so long as it remains substantially inextensible, and the neutral axis remains in a constant fixed position with respect to the surfaces of said cable.

A second wire 63 is attached to member 48 adjacent the contact surface of arc 51 with slot 50 and is wrapped around arc 51 to the point of contact between arc 51 and bar 55 (see FIG. 6). After leaving arc 51, wire 63 follows recessed portion 59 in bar 55 to the end of the bar where it is trained around a pulley 64 and attached at its other end to a spring 65. Spring 65 is secured to an adjusting screw 66 which passes through block 52 and may be adjusted within block 52 by wing-nut 67.

Wire 63 in combination with spring 65 may be replaced by any elastic member having a modulus suitable for providing tension to the wire 58. Wire 63 in combination with spring 65 may also be replaced by a relatively inextensible member, however, this makes it necessary to adjust nut 67 each time the radius of arc 51 is changed by even a relatively small amount.

Referring now to FIGS. 1 and 3, a carriage drive means shown generally at 68 is provided to accomplish the rolling of carriage 17 relative to pitch bar 55. Drive means 68 comprises a motor 69 and a speed reducer 70. A speed adjustment control lever 71 enables the operator to control the rotary speed of shaft 72 which is driven by motor 69. A sprocket 73 is secured to shaft 72 and is connected to and drives sprocket 74 through drive belt 75. Sprocket 74 is secured to one end of lead screw 76 which is journaled adjacent sprocket 74 in block 77. The other end of lead screw 76 is supported and journaled in block 78. Blocks 77 and 78 are secured to the underside of top member 16.

Referring to FIG. 5, a block 79 having a threaded aperture 79a is supported by lead screw 76 and extends upwardly through transverse slot 80 formed in top member 16. A cam roller 81 is carried by block 79 and secured thereto by pin 82 and nut 83. A block 84 having a slot 85 is secured to the underside of pallet 18 and adapted to lie over cam roller 81 which extends upwardly into slot 85.

The rolling of arc 51 on pitch bar 55 is accomplished by controlling the position of block 79 relative to lead screw 76. Motor 69 is provided with a direction control switch 86 which may be utilized to control the direction of rotation of shaft 72. For example, the rotation of shaft 72 in one direction will cause lead screw 76 to rotate in a similar direction and result in the movement of block 79 axially on lead screw 76. Referring to FIG. 1, the movement of block 79 and, likewise, cam roller 81 to the left will result in a rolling of carriage 17 to the left and result in a relative rolling of arc 51 and bar 55. Likewise, an opposite rotation of shaft 72 will result in the movement of cam roller 81 to the right in FIG. 1 which will result in the rolling of carriage 17 to the right. Slot 85 permits the relative movement between cam roller 81 and pallet 18 which is necessary if contact is to be maintained between arc 51 and bar 55 during rolling. Slot 85 also provides a means for maintaining contact between cam roller 81 and pallet 18 when arc 51 is adjusted by the arc device.

It is a stated object of this invention to provide an instrument for simulating the pure rolling between pitch circles of mating members. This object is accomplished by providing wire 58 which is a substantially inextensible member and supporting the wire on two relatively rolling members so that its neutral axis coincides with a portion of the pitch circles of each respective rolling member. As arc 51, which supports a portion of wire 58, rolls relative to bar 55, which supports the remaining portion of wire 58, the neutral axis of wire 58 remains inextensible and, therefore, provides a positive, discernible line at which pure rolling action occurs. Wire 63 provides a means for maintaining wire 58 in a taut condition at essentially constant tension and magnets 54 assure contact between the rolling surfaces of arc 51 and bar 55.

Figure 11:
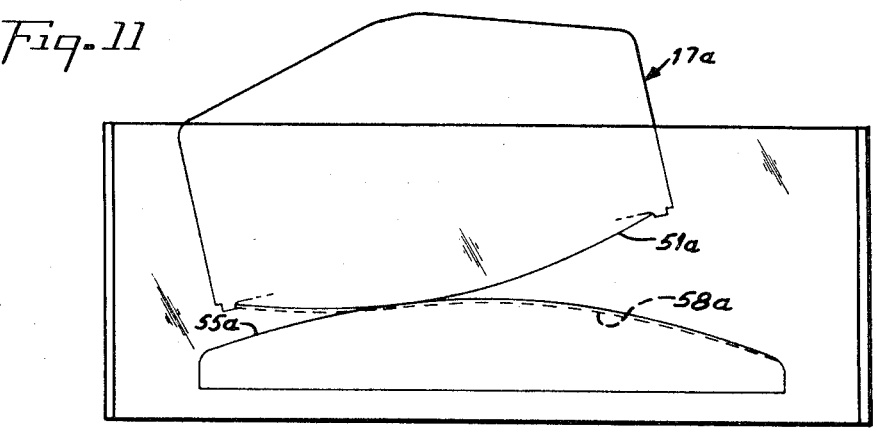
FIG. 11 is a schematic showing another embodiment of the invention.

Although, the instrument has been illustrated with an arc 51 in contact with a pitch bar 55 having a pitch line, it will be apparent to those skilled in the art that the pitch bar 55 may be replaced by an arc. Referring to FIG. 11, a carriage 17a having an arc 51a is shown in rolling contact with an arc 55a. Wire 58a is attached to the arcs in the same manner as wire 58 in the above discussion and the neutral axis of wire 58a will simulate the pure rolling of two pitch circles relative to one another.

The position of wire 58 or 58a may be altered without affecting the operation of the instrument. For example, arc 51 instead of bar 55 may be provided with a recess for entirely receiving wire 58, or arc 51 and bar 55 may both have recesses equal to the radius of wire 58, in which case, the neutral axis of wire 58 will fall at the exact point of contact of the arc and bar. Furthermore, the wire (or flat band which is preferable with this embodiment) may be supported directly on the surfaces of the arc and the bar and thereby eliminate the need for a recess in either member. In the latter construction the sides of the wire or band form the surfaces on which the arc and bar roll.

In any case, the essential feature is to provide two support elements for the wire to hold the wire so that the neutral axis of the wire coincides with the desired pitch circles and the center distances of the pitch circles remain constant during rolling.

The use and operation of the instrument for profile generation will now be described in detail.

Referring to FIG. 2, a pair of vertical support blocks 87 and 88 are laterally spaced and secured to the upper surface of top member 16. Vertically extending pins 89 and 90 are mounted in blocks 87 and 88, respectively. A bridge member shown generally at 91 comprises a pair of laterally spaced support braces 92 and 93 and a thick sheet of transparent plastic 94 secured to the braces. A pair of bushing-lined apertures 95 and 96 extend through braces 92 and 93, respectively, and are adapted to have an accurate sliding fit with pins 89 and 90, respectively.

Referring to FIGS. 1 and 2, a light 97 is supported above table 10 by transversely spaced light supports 98 and 99. Rollers 100 and 101 are secured to the lower portion of light supports 98 and 99, respectively, and are adapted to roll on brackets 102 secured to top member 16. This construction permits the operator to roll light 97 to the rear of table 10 when it is desired to perform operations on the other parts of the instrument.

Figure 8:
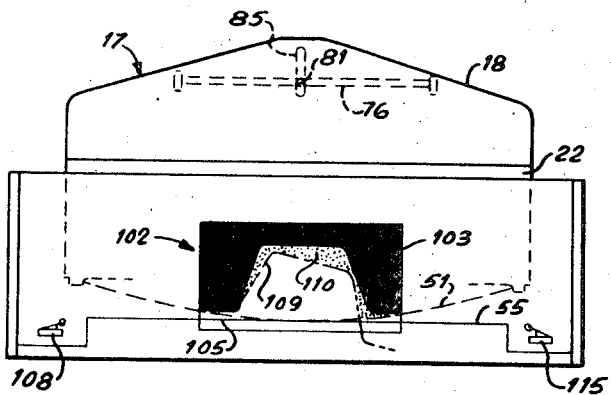
FIG. 8 is a schematic of the invention showing the carriage at the center position.
Figure 9:
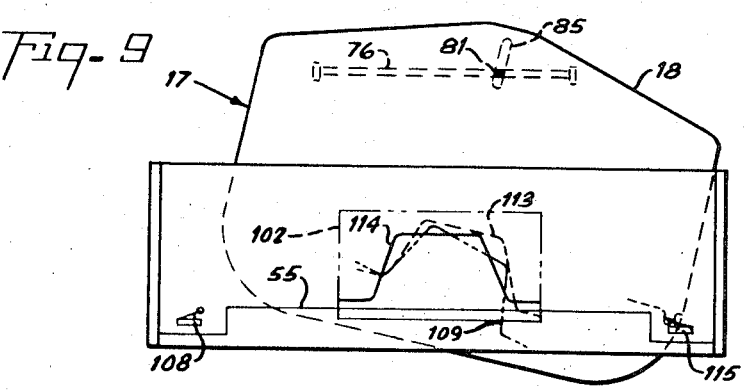
FIG. 9 is a schematic of the invention showing the carriage at an opposite extreme position of travel.

Referring to FIGS. 7, 8 and 9, in the operation of the instrument for generating the conjugate groove profile for a given gear tooth shape, a template or form shown generally at 102 is provided. Form 102 has an opaque region 103 and a transparent region 104 which represents the tooth profile. The form 102 is made of a very thin plastic and is provided with a scribed line 105 on its top surface to indicate the pitch circle of the desired tooth form located on its underside. Form 102 is secured to the underside of bridge 91 and scribed line 105 on the form is aligned with an elongated transverse groove 106 formed on the undersurface of bridge 91 (see FIG. 3a). Groove 106 locates pitch circle 105 of form 102 directly over the neutral axis of wire 58 so that pitch circle 105 coincides with the simulated pitch circle formed by the neutral axis of wire 58 on bar 55. With form 102 thus mounted, a sheet of film 107 is mounted on top of platform 22 (see FIG. 4) and bridge 91 is placed into position on pins 89 and 90.

FIG. 7 illustrates the initial position of carriage 17 with respect to bar 55. Cam roller 81 is at the far left position and carriage 17 is just out of contact with a limit switch 108 which controls light 97 and motor 69. Light 97 is moved to the front of the instrument directly over form 102 and motor 69 and light 97 are actuated which begins the travel of cam roller 81 from left to right as viewed in FIG. 7. The film 107 which appears under the transparent portion 104 of form 102 will immediately be exposed. This initial exposure records the beam of light which passes through transparent region 104 and has the profile of said region. Further movement of carriage 17 will cause additional areas of the film to be exposed as the film moves with the carriage relative to form 102.

Referring to FIG. 8, cam roller 81 is shown in the central position and carriage 17 is now centered with respect to bar 55. The area appearing within dotted line 109 represents the portion of film which was initially exposed as shown in FIG. 7. This portion of film has now moved to a new position relative to form 102. The dotted area indicated by the numeral 110 represents the area of film which is presently being exposed by light 97. Although the above description indicates that the dotted area is exposed at the FIG. 8 position of carriage 17, it will be apparent that all areas of the film not covered by the opaque portion 103 of the form, including the previously exposed areas, will be subjected to light 97 and again exposed or overexposed. This is preferable in that it produces a finished profile, when developed, of uniform shading.

The continued movement of cam roller 81 from its central position in FIG. 8 to its position in FIG. 9 continues to roll arc 51 on bar 55 and film 107 is again shifted relative to form 102. Form 102 is shown in phantom in FIG. 9 so that the two extreme positions and the central position of the film may be adequately illustrated. As seen in FIG. 9, 109 represents the bounds of the area of film which was exposed in the FIG. 7 position of carriage 17, numeral 113 represents the bounds of the area of film exposed in the FIG. 8 position of carriage 17, and numeral 114 represents the bounds of the area which is presently occupied by profile 104 and being exposed by light 97.

The arrival of carriage 17 to its far right position as viewed in FIG. 9 will bring the carriage into contact with limit switch 115 to turn off light 97 and motor 69. It will be apparent that the above operation must be carried out in a dark room and that at the end of the operation film 107 must be removed from the instrument and put through a series of developing steps prior to further exposure of the film.

Figure 10:
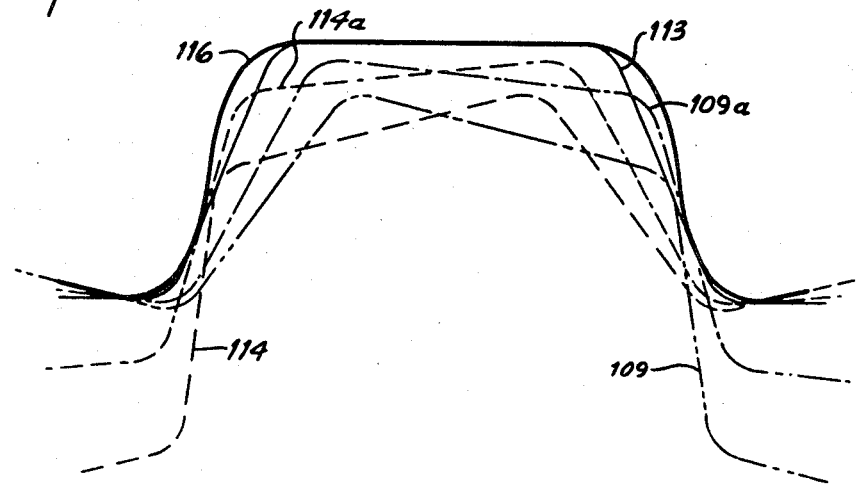
FIG. 10 is a composite view showing the various positions of a template or form profile with relation to a generated conjugate groove.

Referring to FIG. 10, a composite has been illustrated which shows the various positions of the transparent tooth portion 104 as it appears on film 107. Profile 109 represents the position of transparent tooth 104 as it enters groove 116, profile 114 illustrates the position of transparent tooth 104 as it leaves profile 116, and profile 113 illustrates the position of transparent tooth 104 in the central position as it is seated within profile groove 116. The remainder of groove 116 is formed by the virtually infinite number of positions (two of which are illustrated by profiles 109a and 114a) occupied by transparent tooth 104 as the film travels from the far left position in FIG. 7 to the far right position in FIG. 9. This groove 116 represents the conjugate profile form which is generated by transparent tooth 104 during the relative pure rolling of the simulated pitch circles formed by the neutral axial of wire 58.

It is not intended to limit this invention solely to an instrument for generating gear or pulley grooves. It will be apparent to those skilled in the art that a known groove or other profile may be initially established and the total space occupied by said groove or profile may be generated during the pure rolling of the pitch circles of the mating members on which the groove or profile appears. For example, the reverse of the above described generation may be accomplished by providing a form having appropriate opaque and transparent regions and rolling the arc on the bar with the form properly positioned relative to the rolling members.

It is also not intended to limit the instrument to a photographic or automatic application. A technique has also been developed with the instrument that enables the operator to start with a profile which is formed on the edge of a template, and by placing the template in substantially the same manner as form 102, the operator may move carriage 17 in very minute increments and trace the profile, at each position of the carriage, onto a sheet of paper which has been secured to platform 22. This technique requires the additional step of drawing an outline curve to establish a single line which represents the desired profile. However, the technique is still far superior to the previous method of manually obtaining the desired shape or conjugate form.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

I claim:
1. Apparatus for simulating the pure rolling between pitch circles of two mating members comprising a support means, a carriage means movable on said support means, an arc mounted on said carriage means, said arc having a center corresponding to the center of one of said mating members, a bar mounted on said support means, said carriage being freely movable along said bar, said bar being positioned to be contacted by said arc when said carriage is moved in the direction of said bar, said bar having a rolling surface determined from a center corresponding to the center of the other mating member, and a substantially inextensible flexible member interconnecting one end of said arc to an end of said bar remote from said one end whereby said arc may be moved into contact and rolled on said bar and the neutral axis of said flexible member, when said flexible member is maintained in a taut condition, will simulate the pitch circles of said mating members during pure rolling of said pitch circles.

2. The apparatus of claim 1 further comprising means for maintaining said arc in contact with said bar.

3. The apparatus of claim 2 wherein said arc is constructed of a ferrous material and magnetic means are located on the side of said bar remote from said arc for magnetically urging said arc toward said bar.

4. The apparatus of claim 1 further comprising means for rolling said arc relative to said bar.

5. The apparatus of claim 4 wherein said rolling means comprises a slot formed in said carriage, a roller cam disposed in said slot and means for moving said cam in a direction transversely of said support means.

6. The apparatus of claim 1 further comprising means for adjusting said arc so that an arc having any desired radius may be provided.

7. The apparatus of claim 1 wherein said flexible member is maintained in a taut condition by a second flexible member secured at one end to the other end of said arc and secured at its other end to the other end of said bar.

8. Apparatus for simulating the pure rolling between pitch circles of two mating members comprising a support means, a first rolling surface mounted on said support means, said first surface being determined from a center corresponding to the center of one of said mating members, a second rolling surface in contact with said first surface, said second surface having an unconfined center corresponding to the center of the other mating member, and a substantially inextensible flexible member interconnecting one end of said first surface with a remote end of said second surface, said flexible member having a neutral axis and being recessed into at least one of said surfaces so that contact may be maintained between said surfaces, whereby said surfaces maintain said neutral axis at a uniform distance from said surface centers and when said surfaces are rolled relative to one another said neutral axis, when said flexible member is maintained in a taut condition, will simulate the pitch circles of said mating members during pure rolling of said pitch circles.

9. Apparatus for simulating the pure rolling between pitch circles of two mating members comprising a support means, a first rolling surface mounted on said support means, said first surface being determined from a center corresponding to the center of one of said mating members, a second rolling surface adjacent said first surface, said second surface having an unconfined center corresponding to the center of the other mating member, and a substantially inextensible flexible member interconnecting one end of said first surface with a remote end of said second surface, said flexible member being in contact with a portion of said surfaces and having a neutral axis spaced equidistant from said portion of said surfaces, whereby said surfaces maintain said neutral axis at a uniform distance from said surface centers and when said surfaces are rolled relative to one another on said flexible member said neutral axis, when said flexible member is maintained in a taut condition, will simulate the pitch circles of said mating members during pure rolling of said pitch circles.

10. Apparatus for simulating the pure rolling between pitch circles of two mating members comprising a support means, a carriage means freely movable on said support means, an arc mounted on said carriage means, said arc having a center corresponding to the center of one of said mating members, a bar mounted on said support means and positioned to be contacted by said arc when said carriage is moved in the direction of said bar, said bar having a rolling surface determined from a center corresponding to the center of the other mating member, and a substantially inextensible flexible member interconnecting one end of said arc to an end of said bar remote from said one end, said arc being constructed of a ferrous material and magnetic means being located on the side of said bar remote from said arc for magnetically urging said arc toward said bar, whereby said arc may be moved into contact and rolled on said bar and the neutral axis of said flexible member, when said flexible member is maintained in a taut condition, will simulate the pitch circles of said mating members during pure rolling of said pitch circles.

11. Apparatus for simulating the pure rolling between pitch circles of two mating members comprising a support means, a carriage means freely movable on said support means, an arc mounted on said carriage means, said arc having a center corresponding to the center of one of said mating members, a bar mounted on said support means and positioned to be contacted by said arc when said carriage is moved in the direction of said bar, said bar having a rolling surface determined from a center corresponding to the center of the other mating member, and a substantially inextensible flexible member interconnecting one end of said arc to an end of said bar remote from said one end, means for rolling said or relative to said bar comprising a slot formed in said carriage, a roller cam disposed in said slot and means for moving said cam in a direction transversely of said support means, whereby said arc may be moved into contact and rolled on said bar and the neutral axis of said flexible member, when said flexible member is maintained in a taut condition, will simulate the pitch circles of said mating members during pure rolling of said pitch circles.

References Cited

UNITED STATES PATENTS

| | | | |
|---|---|---|---|
| 2,881,530 | 4/1959 | Müller et al. | 33—179.55 |
| 2,897,890 | 4/1959 | Demi | 74—56 |

FRED C. MATTERN, JR., *Primary Examiner.*

W. S. RATLIFF, JR., *Assistant Examiner.*

U.S. Cl. X.R.

33—179.55